(12) United States Patent
Nanda et al.

(10) Patent No.: US 9,060,380 B2
(45) Date of Patent: *Jun. 16, 2015

(54) METHOD AND APPARATUS FOR LOCATING A WIRELESS LOCAL AREA NETWORK IN A WIDE AREA NETWORK

(71) Applicant: QUALCOMM Incorporated, San Diego, CA (US)

(72) Inventors: Sanjiv Nanda, Ramona, CA (US); Aleksandar Gogic, San Diego, CA (US); Manoj M. Deshpande, San Diego, CA (US); Nikhil Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/316,136

(22) Filed: Jun. 26, 2014

(65) Prior Publication Data

US 2014/0307715 A1 Oct. 16, 2014

Related U.S. Application Data

(63) Continuation of application No. 13/851,409, filed on Mar. 27, 2013, now Pat. No. 8,798,008, which is a continuation of application No. 11/355,540, filed on Feb. 15, 2006, now Pat. No. 8,477,731.

(Continued)

(51) Int. Cl.
*H04W 88/06* (2009.01)
*H04W 48/16* (2009.01)
*H04W 64/00* (2009.01)

(52) U.S. Cl.
CPC .............. *H04W 88/06* (2013.01); *H04W 48/16* (2013.01); *H04W 64/00* (2013.01)

(58) Field of Classification Search
None
See application file for complete search history.

(56) References Cited

U.S. PATENT DOCUMENTS

| 5,093,926 A | 3/1992 | Sasuta |
| 5,365,451 A | 11/1994 | Wang et al. |

(Continued)

FOREIGN PATENT DOCUMENTS

| CN | 1642076 A | 7/2005 |
| GB | 2321162 | 7/1998 |

(Continued)

OTHER PUBLICATIONS

European Search Report—EP10011380—Search Authority—Munich—Jun. 24, 2011.

(Continued)

*Primary Examiner* — Ayaz Sheikh
*Assistant Examiner* — Faiyazkhan Ghafoerkhan
(74) *Attorney, Agent, or Firm* — Anthony R. Morris

(57) ABSTRACT

The disclosure is directed to a mobile communication device that measures characteristics or attributes of a first communications network that vary according to physical location within that first communications network to create a fingerprint, or signature, of a location within the first communications network. When the fingerprint of the current location of the mobile device is created it can be compared to a known fingerprint associated with a second communication network to determine the mobile device's proximity to the second communications network. For example, the first communications network may be a CDMA wide area wireless communication network and the second communications network may be a 802.11 wireless LAN.

30 Claims, 5 Drawing Sheets

Related U.S. Application Data

(60) Provisional application No. 60/702,591, filed on Jul. 25, 2005, provisional application No. 60/750,920, filed on Dec. 16, 2005, provisional application No. 60/750,919, filed on Dec. 16, 2005.

(56) References Cited

U.S. PATENT DOCUMENTS

| | | | |
|---|---|---|---|
| 5,392,458 A * | 2/1995 | Sasuta et al. | 455/432.3 |
| 5,437,053 A | 7/1995 | Sawa et al. | |
| 5,917,811 A * | 6/1999 | Weaver et al. | 370/332 |
| 6,134,523 A | 10/2000 | Nakajima et al. | |
| 6,167,268 A * | 12/2000 | Souissi et al. | 455/434 |
| 6,714,597 B1 | 3/2004 | Antonio et al. | |
| 6,832,090 B2 | 12/2004 | Riley et al. | |
| 6,915,123 B1 | 7/2005 | Daudelin et al. | |
| 7,440,755 B2 * | 10/2008 | Balachandran et al. | 455/435.2 |
| 8,477,731 B2 * | 7/2013 | Nanda et al. | 370/332 |
| 8,483,704 B2 * | 7/2013 | Nanda et al. | 455/456.1 |
| 8,798,008 B2 * | 8/2014 | Nanda et al. | 370/332 |
| 2002/0177460 A1 * | 11/2002 | Beasley et al. | 455/502 |
| 2003/0045299 A1 * | 3/2003 | New | 455/455 |
| 2003/0054813 A1 * | 3/2003 | Riley et al. | 455/424 |
| 2003/0201931 A1 * | 10/2003 | Durst et al. | 342/357.07 |
| 2004/0012519 A1 * | 1/2004 | Durst et al. | 342/357.07 |
| 2004/0102969 A1 | 5/2004 | Manjunath et al. | |
| 2004/0185873 A1 * | 9/2004 | Gilkes et al. | 455/456.2 |
| 2004/0259546 A1 * | 12/2004 | Balachandran et al. | 455/435.2 |
| 2004/0260542 A1 | 12/2004 | Ananthapadmanabhan et al. | |
| 2005/0130677 A1 * | 6/2005 | Meunier et al. | 455/456.6 |
| 2005/0136845 A1 * | 6/2005 | Masuoka et al. | 455/67.14 |
| 2005/0246334 A1 * | 11/2005 | Tao et al. | 707/5 |
| 2006/0025158 A1 * | 2/2006 | Leblanc et al. | 455/456.2 |
| 2006/0058056 A1 * | 3/2006 | Das et al. | 455/524 |
| 2006/0218610 A1 * | 9/2006 | Jansen et al. | 725/105 |
| 2007/0019586 A1 | 1/2007 | Nanda et al. | |
| 2007/0021126 A1 * | 1/2007 | Nanda et al. | 455/456.1 |
| 2008/0039114 A1 * | 2/2008 | Phatak et al. | 455/456.1 |
| 2013/0210485 A1 | 8/2013 | Nanda et al. | |

FOREIGN PATENT DOCUMENTS

| | | |
|---|---|---|
| GB | 2368240 A | 4/2002 |
| JP | 2002010325 A | 1/2002 |
| JP | 2003198566 A | 7/2003 |
| JP | 2005509136 A | 4/2005 |
| JP | 2005123662 A | 5/2005 |
| RU | 2117394 | 8/1998 |
| RU | 2157591 | 10/2000 |
| RU | 2003127839 A | 3/2005 |
| TW | I227644 | 2/2005 |
| WO | 9619887 A1 | 6/1996 |
| WO | 0162034 A1 | 8/2001 |
| WO | 03101138 A1 | 12/2003 |
| WO | 2004004371 A1 | 1/2004 |
| WO | 2004057360 A2 | 7/2004 |
| WO | 2004112317 A1 | 12/2004 |
| WO | 2005062066 A2 | 7/2005 |

OTHER PUBLICATIONS

European Search Report—EP10184952—Search Authority—Munich—Jul. 6, 2011.
IEEE 802.11i—2004, "Part 11: Wireless LAN Medium Access Control (MAC) and Physical Layer (PHY) specifications", IEEE Standard 802.11i, Jul. 2004.
International Preliminary Report on Patentability—PCT/US06/028731—The International Bureau of WIPO, Geneva, Switzerland—Jan. 29, 2008.
International Preliminary Report on Patentability—PCT/US06/028732—The International Bureau of WIPO, Geneva, Switzerland—Jan. 29, 2008.
International Search Report—PCT/US06/028731—International Search Authority, European Patent Office—Dec. 11, 2006.
International Search Report—PCT/US06/028732—International Search Authority, European Patent Office—Dec. 11, 2006.
Junius M et al: "New Methods for Processing GSM Radio Measurement Data: Applications for Locating, Handover and Network Management", Proceedings of the Vehicular Technology Conference. Stockholm, vol. 1 Conf. 44, pp. 338-342, Jun. 8, 1994,XP000496691.
Taiwan Search Report—TW095127124—TIPO—May 18, 2011.
Taiwan Search Report—TW095127132—TIPO—Jun. 8, 2011.
Written Opinion—PCT/US06/028731—International Search Authority, European Patent Office—Dec. 11, 2006.
Written Opinion—PCT/US06/028732—International Search Authority, European Patent Office—Dec. 11, 2006.

* cited by examiner

METHOD AND APPARATUS FOR LOCATING A WIRELESS LOCAL AREA NETWORK IN A WIDE AREA NETWORK

CLAIM OF PRIORITY UNDER 35 U.S.C. §119

The present Application for Patent is a continuation of U.S. patent application Ser. No. 13/851,409, entitled "METHOD AND APPARATUS FOR LOCATING A WIRELESS LOCAL AREA NETWORK IN A WIDE AREA NETWORK," filed Mar. 27, 2013, now allowed, which is a continuation of U.S. patent application Ser. No. 11/355,540, entitled "METHOD AND APPARATUS FOR LOCATING A WIRELESS LOCAL AREA NETWORK IN A WIDE AREA NETWORK," filed Feb. 15, 2006, issued as U.S. Pat. No. 8,477,731 Jul. 2, 2013, which claims priority to Provisional Application No. 60/702,591 entitled, "ASSISTED WIRELESS NETWORK ACCESS POINT SEARCH IN WIRELESS COMMUNICATION NETWORKS", filed Jul. 25, 2005, and Provisional Application No. 60/750,920 entitled, "METHOD AND APPARATUS FOR LOCATING A WIRELESS LOCAL AREA NETWORK IN A WIDE AREA NETWORK," filed Dec. 16, 2005, and Provisional Application No. 60/750,919 entitled, "METHOD AND APPARATUS FOR MAINTAINING A FINGERPRINT FOR A WIRELESS NETWORK," filed Dec. 16, 2005, all of which are assigned to the assignee hereof and hereby expressly incorporated by reference herein.

BACKGROUND

1. Field

The present disclosure relates generally to telecommunications, and more particularly, to systems and methods to support a mobile communications device capable of communicating via two different types of communication networks.

2. Background

The demand for wireless information services has led to the development of an ever increasing number of wireless networks. CDMA2000 1x is just one example of a wireless network that provides wide area telephony and data services. CDMA2000 1x is a wireless standard promulgated by the Third Generation Partnership Project 2 (3GPP2) using code division multiple access (CDMA) technology. CDMA is a technology that allows multiple users to share a common communications medium using spread-spectrum processing. A competing wireless network that is commonly employed in Europe is Global System for Mobile Communications (GSM). Unlike CDMA2000 1x, GSM uses narrowband time division multiple access (TDMA) to support wireless telephony and data services. Some other wireless networks include General Packet Radio Service (GPRS) which supports high speed data services with data rates suitable for e-mail and web browsing applications, and Universal Mobile Telecommunications System (UMTS) which can deliver broadband voice and data for audio and video applications.

These wireless networks can generally be thought of as wide area networks employing cellular technology. Cellular technology is based on a topology in which the geographic coverage region is broken up into cells. Within each of these cells is a fixed base transceiver station (BTS) that communicates with mobile users. A base station controller (BSC) is typically employed in the geographic coverage region to control the BTSs and route communications to the appropriate gateways for the various packet-switched and circuit-switched networks.

As the demand for wireless information services continue to increase, mobile devices are evolving to support integrated voice, data, and streaming media while providing seamless network coverage between wide area wireless networks (WANs) and wireless local area networks (LAN). Wireless LANs generally provide telephony and data services over relatively small geographic regions using a standard protocol, such as IEEE 802.11, Bluetooth, or the like. The existence of wireless LANs provides a unique opportunity to increase user capacity in a wide area wireless network by extending wide area communications to the unlicensed spectrum using the infrastructure of the wireless LAN.

Recently, various techniques have been employed to enable mobile devices to communicate with different wireless networks. Additional techniques have been employed to allow a mobile device to search for the presence of a wireless LAN to determine if one is available to connect to. However, frequent or continuous searching for a wireless LAN unnecessarily consumes power and can quickly discharge batteries in the mobile device. Accordingly, improvements in power consumption and battery life for mobile devices may be realized by intelligently searching for available wireless LANs.

SUMMARY

One aspect of a wireless communications device is disclosed. The wireless communications device includes memory configured to store information relating to a first communications network, and a processor configured to determine whether the wireless communications device is in the vicinity of the first communications network based on the information stored in the memory and one or more reference signals from a second communications network.

Another aspect of a wireless communications device is disclosed. The communications device includes memory configured to store information relating to a plurality of wireless LANs dispersed through a WAN, and a processor configured to determine whether the wireless communications device is in the vicinity of one of the wireless LANs based on the information stored in the memory and one or more reference signals from the WAN.

Computer readable media embodying a program of instructions executable by a computer to perform a method of communications is disclosed. The method includes accessing information in memory, the information relating to a first communications network, receiving one or more reference signals from a second communications network, and determining whether a wireless communications device is in the vicinity of the first communications network based on the information accessed from the memory and the one or more reference signals from the second communications network.

A method of communications is disclosed. The method including accessing information in memory, the information relating to a first communications network, receiving one or more reference signals from a second communications network, and determining whether a wireless communications device is in the vicinity of the first communications network based on the information accessed from the memory and the one or more reference signals from the second communications network.

A further aspect of a wireless communications device is disclosed. The wireless communications device includes means for storing information relating to a first communications network, and means for determining whether the wireless communications device is in the vicinity of the first communications network based on the information and one or more reference signals from a second communications network.

It is understood that other embodiments of the present disclosure are within scope of the following detailed description, wherein it is shown and described only various embodiments of the disclosure by way of illustration. As will be realized, the disclosure is capable of other and different embodiments and its several details are capable of modification in various other respects, all without departing from the spirit and scope of the present disclosure. Accordingly, the drawings and detailed description are to be regarded as illustrative in nature and not as restrictive.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various embodiments of the disclosure and is not intended to represent the only embodiments in which the disclosure may be practiced. The detailed description includes specific details for the purpose of providing a thorough understanding of the disclosure. In some instances, well known structures and components are shown in block diagram form in order to avoid obscuring the concepts of the disclosure.

In the following detailed description, various techniques will be described in connection with the handoff of a mobile user from one network to another. A number of these techniques will be described in the context of a mobile communications device traveling through a wide area WAN with one or more wireless LANs dispersed throughout the WAN coverage region. The mobile communications device may be any suitable device capable of wireless telephony or data communications, such as a cellular phone designed for operation in a CDMA2000 1x network. The mobile communications device may be capable of employing any suitable protocol for accessing a wireless LAN, including, by way of example, IEEE 802.11. While these techniques may be described in the context of a WAN phone capable of communicating with an IEEE 802.11 network, these techniques can be extended to other mobile communication devices capable of accessing multiple networks. For instance, these techniques may be applied to a mobile communications device capable of switching between a CDMA2000 1x network and a GSM network. Accordingly, any reference to a cellular phone capable of communicating with an IEEE 802.11 network, or any other specific embodiment, is intended only to illustrate various aspects of the present disclosure, with the understanding that these aspects have a wide range of applications.

Figure 1A:
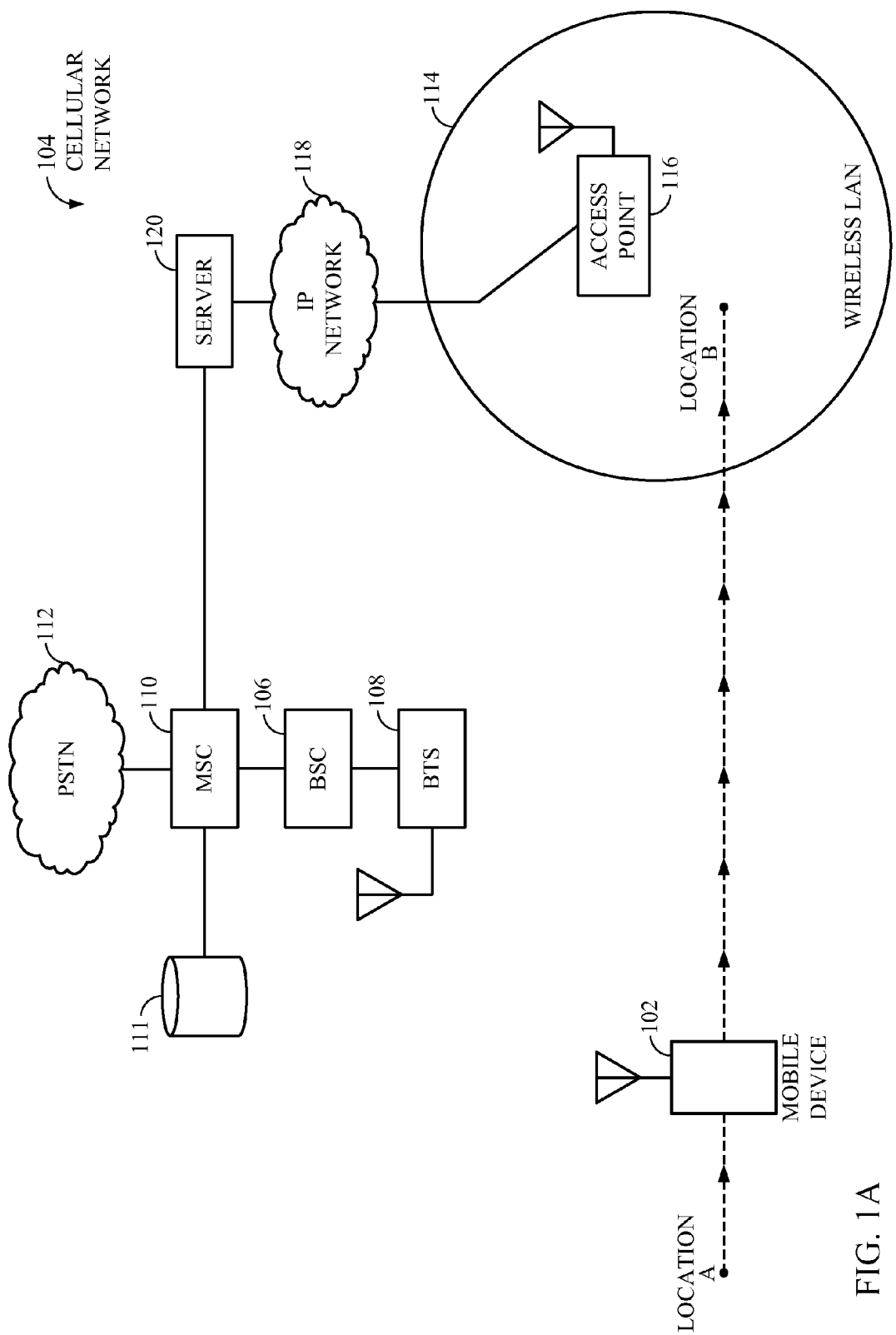
FIG. 1A is a conceptual block diagram of an embodiment of a wireless communications system.

FIG. 1A is a conceptual block diagram of an embodiment of a wireless communications system. A mobile device 102 is shown moving through a WAN 104 by a series of broken lines. The WAN 104 includes a BSC 106 supporting a number of BTSs dispersed throughout the WAN coverage region. A single BTS 108 is shown in FIG. 1 for simplicity of explanation. A mobile switching center (MSC) 110 may be used to provide a gateway to a public switched telephone network (PSTN) 112. Although not shown in FIG. 1, the WAN 104 may employ numerous BSCs each supporting any number of BTSs to extend the geographic reach of the WAN 104. When multiple BSCs are employed throughout the WAN 104, the MSC 110 may also be used to coordinate communications between the BSCs.

The WAN 104 may also include one or more wireless LANs dispersed throughout the wide area wireless coverage region. A single wireless LAN 114 is shown in FIG. 1. The wireless LAN 114 may be an IEEE 802.11 network, or any other suitable network. The wireless LAN 114 includes an access point 116 for the mobile device 102 to communicate with an IP network 118. A server 120 may be used to interface the IP network 118 to the MSC 110, which provides a gateway to the PSTN 112.

When power is initially applied to the mobile device 102, it will attempt to access either the WAN 104 or the wireless LAN 114. The decision to access a particular network may depend on a variety of factors relating to the specific application and overall design constraints. By way of example, the mobile device 102 may be configured to access the wireless LAN 114 when the service quality meets a minimum threshold. To the extent the wireless LAN 114 can be used to support mobile telephony and data communications, valuable bandwidth may be freed up for other mobile users.

The mobile device 102 may be configured to continuously or periodically search for a beacon from the access point 116, or any other access point of a wireless LAN. The beacon is a periodic signal transmitted by the access point 116 with synchronization information. WLAN beacon search requires the mobile device to in turn tune to possible WLAN channels, in one or more operable bands of a WLAN system, and conduct either an active scan or a passive scan on the channel. In a passive scan the mobile device just tunes to the channel and receives for a specific period of time waiting for a beacon transmission. In an active scan, the mobile device tunes to the channel and transmits a probe request after following the access procedures to avoid colliding with existing devices on the channel. On receipt of the probe request the access point transmits a probe response to the mobile device. In the event that the mobile device 102 cannot detect a beacon or receives no probe response to a probe request, which might be the case if power is applied to the mobile device 102 at location A, then the mobile device 102 attempts to access the WAN 104. With respect to FIG. 1B, described later, the mobile device 102 does not continuously (or periodically) scan for a WLAN access point but, instead, scans for a WLAN access point only when it determines it is close to the wireless LAN 114. The mobile device 102 may access the WAN 104 by acquiring a pilot signal from the BTS 108. Once the pilot signal is acquired, a radio connection may be established between the mobile device 102 and the BTS 108 by means well known in the art. The mobile device 102 may use the radio connection with the BTS 108 to register with the MSC 110. Registration is the process by which the mobile device 102 makes its whereabouts known to the WAN 104. When the registration process is complete, the mobile device 102 may enter into an idle state until a call is initiated, either by the mobile device 102 or the PSTN 112. Either way, an air traffic link may be established between the mobile device 102 and the BTS 108 to set up and support the call.

When the mobile device 102 moves through the WAN 104 from location A to location B in the depicted embodiment, it is now able to detect a beacon from the access point 116. Once this occurs, a radio connection may be established between the two by means well known in the art. The mobile device 102 then obtains the IP address of the server 120. The mobile device 102 may use the services of a Domain Name Server (DNS) to determine the server's IP address. The domain name of the server 120 may be delivered to the mobile device 102 over the WAN 104. With the IP address, the mobile device 102 can establish a network connection with the server 120. Once the network connection is established, information from the server 120 can be used in conjunction with local measurements to determine whether the service quality of the wireless LAN 114 is sufficient to handoff the mobile device 102 to the access point 116.

It should be noted, that while FIG. 1A is generally descriptive of a cellular WAN, other WANs may be utilized. This may include those that do not utilize MSCs or other cellular structures, and those WANs utilizing other communication protocols including wideband CDMA (WCDMA), TD-CDMA, GSM, or the like.

Figure 1B:
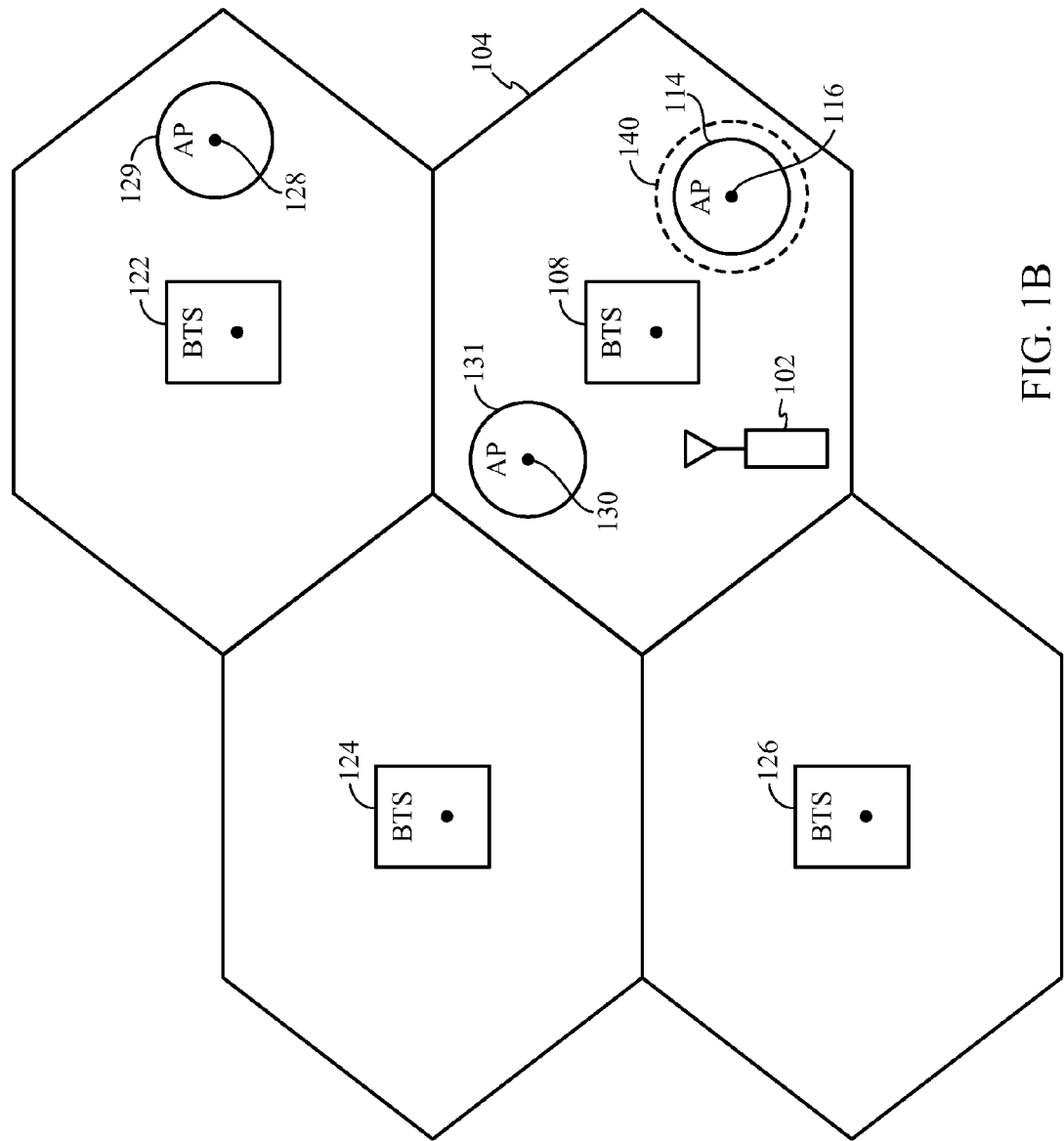
FIG. 1B is a conceptual block diagram of another embodiment of a wireless communications system.

Referring now to FIG. 1B, the wireless LAN 114 and BTS 108 are shown in the context of a larger WAN having multiple BTS 122, 124, 126 and also multiple wireless LANs 129, 131 and associated access points 128, 130. As shown in FIG. 1B, the mobile device 102 is within the coverage area of any wireless LAN. Accordingly, searching for a beacon signal while in this location will prove fruitless and unnecessarily consume power. Even though the mobile device may frequently enter a sleep or idle mode to conserve power, searching for wireless LAN beacon signals can quickly consume power. In a typical 802.11 network configuration, the beacon signals occur at intervals measured in tens of milliseconds; thus, the mobile device must remain awake and searching for at least that period of time per channel and considering that the wireless LAN access point may be configured for different frequency ranges and channels within those ranges, the mobile device 102 must remain awake a significant amount of time to search for available wireless LAN access points. Similarly, in the case of an active scan, the mobile device must stay awake to follow the channel access procedures on the channel, then transmit a probe request and stay awake to receive a probe response. It must conduct this procedure on each channel. In this case as well, the mobile device 102 must remain awake a significant amount of time to search for available wireless LAN access points, which may result in increased power consumption and processing overhead.

However, by limiting searching for beacon signals to periods when the mobile device is within the area 140, a significant savings in power consumption may be realized. Thus, when the mobile device 102 periodically awakes to listen to the paging channel or a quick paging channel in the WAN it may also determine its location. If it determines that its location is within the area 140, then it can search for a wireless LAN beacon signal. Otherwise, it can avoid unnecessarily searching for the beacon signal.

A mobile device 102 may monitor beacon and pilot signals from the base stations of the WAN. These signals can include pilot and paging signals. The mobile device monitors these signals to measure primary and neighbor signal strengths to perform hand-offs between base stations. Also, in networks where the base stations are synchronized, the mobile device may also measure a phase of each pilot signal to assist with hand-off determination. Thus, at any location within the network 104, the mobile device 102 observes up to n base stations with measurable signal strengths which can be characterized as two vectors $x_1, \ldots, x_n$, and $y_1, \ldots, y_n$. Where each x value is a signal strength of a pilot signal from a base station and each y value is a phase of the pilot signal from a base station. When there are fewer than n observed signals, the remaining values are set to null. Because the pilot signals have a pilot phase offset associated with them, the signal strengths and phases may be easily identified as originating from a particular base station. In other WAN technologies like GSM, the neighbors base stations may be identified by their frequency channel or other base station identifier and a signal strength associated with each base station. In certain aspects, any signal utilized for acquisition, timing, or the like may be utilized as the signal that is utilized to obtain the measurements to form the one or more vectors described above. Further, the vectors need not be formed, stored, or utilized as two vectors as described, or include the information in the format described above. Thus, in some aspects, information that identifies a source and at least one characteristic of the reference signal, e.g. pilot or paging signal, is utilized.

As is known in the art, the mobile device 102 monitors beacon and pilot signals from the base stations of the cellular network. These signals can include pilot and paging signals. The mobile device monitors these signals to measure primary and neighbor signal strengths to perform hand-offs between base stations. Also, in networks where the base stations are synchronized, the mobile device may also measure a phase of each pilot signal to assist with hand-off determination. Thus, at any location within the network 104, the mobile device 102 observes up to n base stations with measurable signal strengths which can be characterized as two vectors $x_1, \ldots, x_n$, and $y_1, \ldots, y_n$. Where each x value is a signal strength of a pilot signal from a base station and each y value is a phase of the pilot signal from a base station. When there are fewer than n observed signals, the remaining values are set to null. Because the pilot signals have a pilot phase offset associated with them, the signal strengths and phases may be easily identified as originating from a particular base station. In other WAN technologies like GSM, the neighbors base stations may be identified by their frequency channel or other base station identifier and a signal strength associated with each base station.

In WCDMA, base stations may not be synchronized. As in CDMA, when the mobile camps in the idle state on the paging channel of a particular base station, it scans for neighbor base station signals. In the case of CDMA each base station uses offsets of the same pseudo-random spreading sequence. In the case of WCDMA, each base station transmits a number of signals designed to allow the mobile station to rapidly acquire synchronization with the signals transmitted by that base station and once synchronized determine the spreading code group and spreading code in use by that base station. The set of spreading codes and their signal strengths may be used to create the fingerprint to identify a location in WCDMA coverage corresponding to pilot offsets and pilot signal strengths in the CDMA system. Relative timing offsets of neighbor base stations may also be used corresponding to pilot phases in CDMA, however, if the base stations are not synchronized, their clocks may have relative drift making the timing offset an unreliable indicator.

The information may be utilized as a conceptual a fingerprint, or a signature, of a location of the mobile device 102. Thus, if locations within the area 140 have a certain known fingerprint, then the mobile device can determine its current fingerprint and compare it to the known fingerprint to determine whether the mobile device is located within the area 140. While the above discussion merely mentions using two attributes of the WAN (i.e., pilot signal strength and phases). Further, as discussed above, other dynamic attributes of the WAN may be used instead of, or in combination with, these two attributes. For example, pilot offset values may be used as a fingerprint; even the number of pilot signals available is a possible attribute to be used for a fingerprint. Furthermore, the attributes that make up the fingerprint do not necessarily have to be attributes of the WAN. For example, many mobile devices have GPS receivers that can be used to determine the location of the mobile device relative to a wireless LAN. The GPS information may be used directly or even indirectly. As one example of the latter case, a base station ID along with phase measurements of GPS signals from different satellites may be used to define a fingerprint that corresponds to a location of the mobile device. Thus, in its broadest sense, a fingerprint is a collection of attributes of a first communication network that change based on location and can be used by the mobile device to determine the proximity of a second communication network. In addition, the fingerprint can also include characteristics of the transmitters of the second communication networks (e.g. MAC ID, Band, Channel, RSSI information of the WiFi access points.) In such an instance, the WAN parameters may be thought of as trigger parameters such that a match of the parameters triggers a WLAN search. The WLAN parameters can be used during the search as the search parameters for the triggered search.

The attributes may be calculated in a variety of different ways without departing from the scope of the present disclosure. For example, an instantaneous measurement may be taken of such attributes as pilot signal strength and phase and used as the fingerprint. However, even when the mobile device is stationary, the values of these attributes vary because of environmental variability. Accordingly, multiple measurements may be taken and averaged together or otherwise combined in some statistically significant manner in order to generate the fingerprint.

Figure 2:
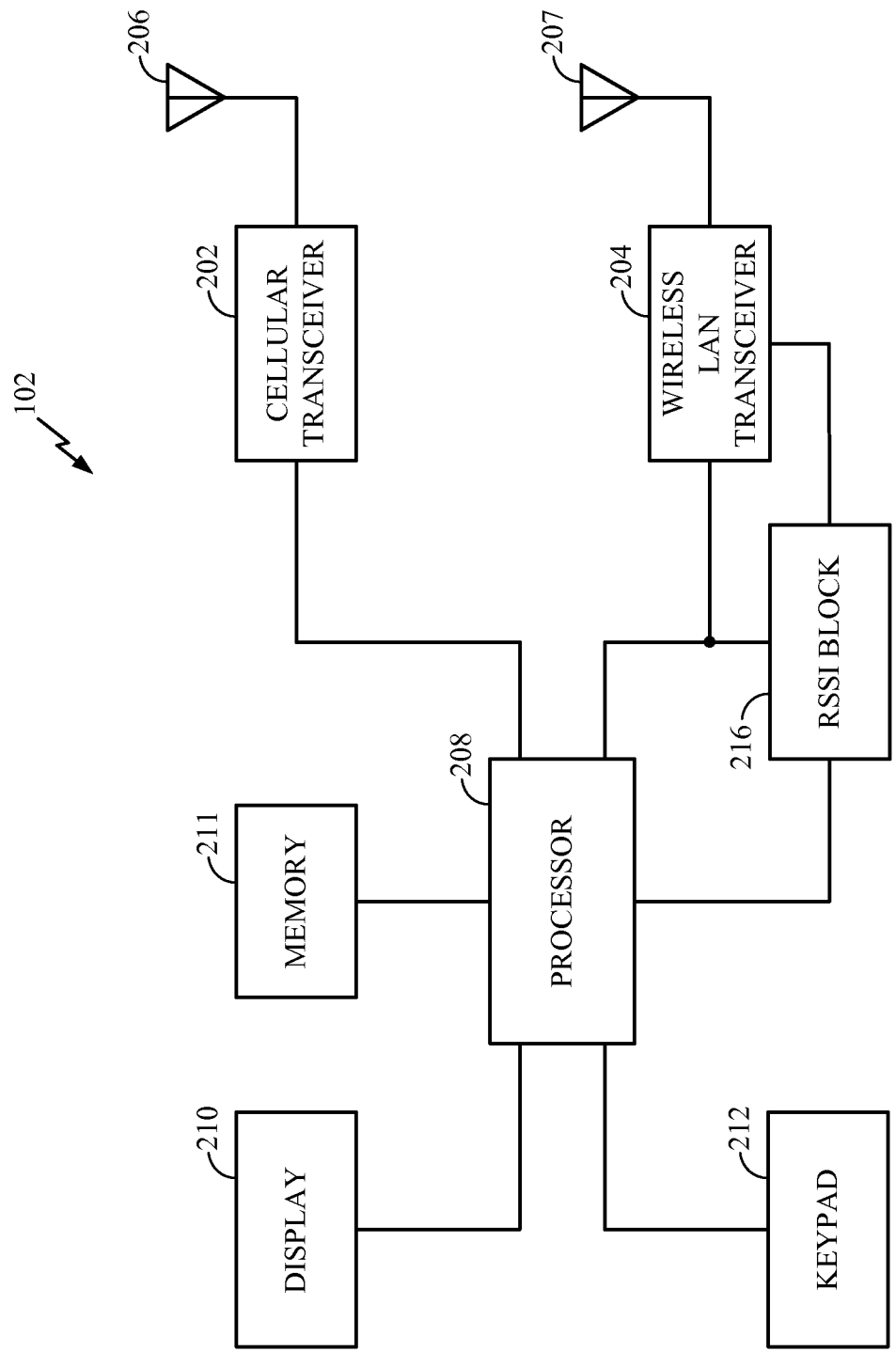
FIG. 2 is a functional block diagram illustrating an example of a mobile device capable of supporting both wide area wireless and wireless LAN communications.

FIG. 2 is a functional block diagram illustrating an example of a mobile device capable of supporting both WAN and wireless LAN communications. The mobile device 102 may include a WAN transceiver 202 and a wireless LAN transceiver 204. In at least one embodiment of the mobile device 102, the WAN transceiver 202 is capable of supporting CDMA2000 1x, WCDMA, GSM, TD-CDMA, or other WAN communications with a BTS (not shown), and the wireless LAN transceiver 204 is capable of supporting IEEE 802.11 communications with an access point (not shown). It should be noted, that the concepts described in connection with the mobile device 102 can be extended to other WAN and wireless LAN technologies. Each transceiver 202, 204 is shown with a separate antenna 206, 207, respectively, but the transceivers 202, 204 could share a single broadband antenna. Each antenna 206, 207 may be implemented with one or more radiating elements.

The mobile device 102 is also shown with a processor 208 coupled to both transceivers 202, 204, however, a separate processor may be used for each transceiver in alternative embodiments of the mobile device 102. The processor 208 may be implemented as hardware, firmware, software, or any combination thereof. By way of example, the processor 208 may include a microprocessor (not shown). The microprocessor may be used to support software applications that, among other things, (1) control and manage access to the wide area wireless communication network and wireless LAN, and (2) interface the processor 208 to the keypad 210, display, 212, and other user interfaces (not shown). The processor 208 may also include a digital signal processor (DSP) (not shown) with an embedded software layer that supports various signal processing functions, such as convolutional encoding, cyclic redundancy check (CRC) functions, modulation, and spread-spectrum processing. The DSP may also perform vocoder functions to support telephony applications. The manner in which the processor 208 is implemented will depend on the particular application and the design constraints imposed on the overall system. It should be noted that the hardware, firmware, and software configurations may interchangeable under these circumstances, and how best to implement the described functionality for each particular application.

The processor 208 may be configured to execute an algorithm to trigger a handoff from one network to another. The algorithm may be implemented as one or more software applications supported by the microprocessor based architecture discussed earlier. Alternatively, the algorithm may be a module separate from the processor 208. The module may be implemented in hardware, software, firmware, or any combination thereof. Depending on the specific design constraints, the algorithm could be integrated into any entity in the mobile device 102, or distributed across multiple entities in the mobile device 102.

For certain purposes known in the art, the signal strength from the access point may be measured at the mobile device 102 with a received signal strength indicator (RSSI) block 216. The RSSI is most likely a measure of strength of an existing signal that is fed back to the wireless LAN transceiver 204 for automatic gain control, and therefore, can be provided to the processor 208 without increasing the circuit complexity of the mobile device 102. Alternatively, the quality of the radio connection may be determined from the beacon. Since the beacon is a spread-spectrum signal that is known, a priori, a replica of the beacon can be stored in memory 211 at the mobile device 102. The demodulated beacon may be used with the replica beacon stored in memory to estimate the energy of the transmitted beacon by means well known in the art.

Referring back to the previously mentioned fingerprints, the mobile device 102 also includes an algorithm executable by the processor 208 for creating multiple fingerprints and comparing different fingerprints to one another. For example, using the keypad 212, a user of the mobile device 102 may select a key that causes the mobile device 102 to create a current fingerprint and store that fingerprint in memory 211. If at the time the fingerprint is created, the mobile device is connected to a wireless LAN, then the stored fingerprint may be associated with that wireless LAN access point. In addition, the fingerprint can also be recorded automatically on a periodic basis or at programmatic events such as successful access, successful access with desired quality of service, etc.

As a result of the above process, the memory 211 may contain a wireless LAN search table arranged, for example, similar to the following table:

| WAN ID | WLAN SSID | WLAN BSS ID | Signal Strength | Phase |
|---|---|---|---|---|
| A | I1 | $A_1$ | $s_1(A_1) \ldots s_n(A_1)$ | $p_1(A_1) \ldots p_n(A_1)$ |
|   |    | $A_2$ | $s_1(A_2) \ldots s_n(A_2)$ | $p_1(A_2) \ldots p_n(A_2)$ |
|   | I2 | $A_3$ | $s_1(A_3) \ldots s_n(A_3)$ | $p_1(A_3) \ldots p_n(A_3)$ |
| B | I1 | $B_1$ | $S_1(B_1) \ldots s_n(B_1)$ |  |
|   | I2 | $B_2$ | $S_1(B_2) \ldots s_n(B_2)$ |  |

The first column of the table refers to the WAN ID of the WAN. The WAN ID identifies the system and network for the WAN known as the SID/NID in the wide area wireless system. The particular base stations in the WAN may be identified by the pilot offsets, pilot signal strengths or other attribute which are part of the finger print as discussed below. The fingerprint identifies the location of the mobile device. The second column refers to the text identifier of the WLAN network. The third identifier refers to wireless LAN access points (also known as BSS). In the exemplary table there are three access points ($A_1, A_2, A_3$) within the first coverage area of base station A. Similarly, there are two access points within the coverage area of the base station B. There may, of course, be many more wireless LANs within the areas covered by any WAN ID but the user of the mobile device may not be interested in those access points because they are associated with wireless LANs that the user may not be permitted to access. Accordingly, the table may merely include a fingerprint for those access points to which the user typically connects.

The two remaining columns include the values that comprise the fingerprint itself. In this example table the fingerprints for the access points $A_1$, $A_2$, and $A_3$ include both strength and phase information. However, the fingerprints for the access points $B_1$ and $B_2$ comprise only signal strength information. Also note that although each fingerprint in this table is denoted by a vector of length n, there may be less than n non-null components of the vector. That is, several values may be null so that the fingerprint comparison is restricted to the vector components that are not null. In operation, a mobile device may awaken from a sleep or idle mode and calculate a fingerprint for its current location and compare it to the information in columns 4 and 5 in the table. The mobile device typically limits the fingerprint match to entries corresponding to the WAN ID with which it is currently registered. Thus, when registered with WAN ID A, only fingerprints associated with WAN ID A in the table are used for matching. The fingerprint creation and comparison may take place during ongoing calls as well. Based on the comparison, the mobile device may determine that an access point with SSID and BSSID indicated in columns 1 and 2 is near enough to search for its beacon signal; otherwise it may return to idle mode without bothering to search for a wireless LAN beacon signal.

The above table is exemplary in nature and does not describe all the possible information that may be used to characterize a fingerprint nor all the different combinations of WAN IDs versus access point IDs. or example, since most include its capabilities such as security, quality of service, throughput and networking information.

Figure 3A:
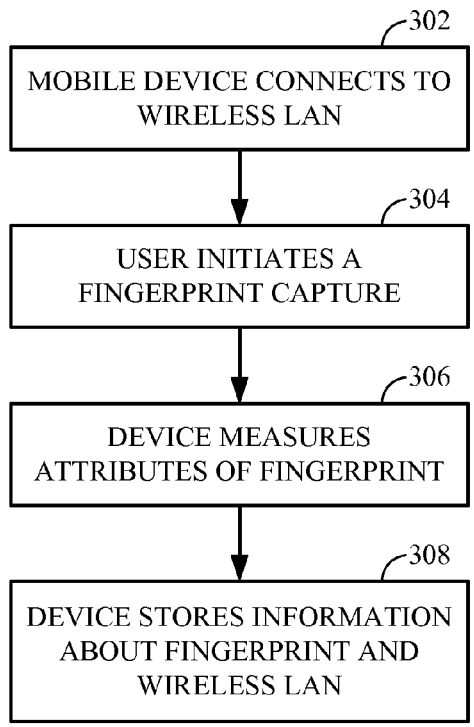
FIG. 3A depicts a flowchart of an exemplary method to create fingerprints on a mobile communications device.

The creation of the fingerprint table is described with reference to the flowchart of FIG. 3A. In step 302, the mobile device connects to a wireless LAN. Without the benefit of any pre-stored fingerprints, the mobile device scans for a WLAN access point in the typical way. Once the mobile device has connected with the access point, the user may, in step 304, signal to the device to capture the current fingerprint. This step may typically be user-initiated because the user may want only certain wireless LANs to be stored in the fingerprint database such as those wireless LANs that the user normally subscribes to or connects. However, the creating of a fingerprint may be automatically initiated by the mobile device as one of the many steps performed when connecting to the wireless LAN.

In step 306, the mobile device captures the values for those attributes that comprise the fingerprint and, in step 308, the device stores the fingerprint in a database. Along with the fingerprint, it is advantageous to store attributes of the currently connected wireless LAN as well.

The comparison of a current fingerprint to a stored fingerprint can be performed in a variety of ways without departing from the scope of the present disclosure. One particular technique is described below. However, many alternative, but functionally equivalent, techniques may be used as well.

The attributes that make up the fingerprint may have values that vary (even for the same location) or are difficult to measure with a high degree of accuracy. Thus, a comparison between fingerprints should not rely on exact duplicity as a test to determine a match. Similarly, the region 140 may reflect an operational decision to place more importance on detecting access points earlier at the expense of false alarms. In other words, if the region 140 is selected to be much larger than the region 114, then a mobile device 102 will determine that it should search for a beacon signal at time when it is not within the region 114 (i.e., a false alarm). If, however, the region 140 is selected to closely mimic the region 114, then there will be instances where the mobile device should be searching for a beacon signal but the fingerprint matching algorithm has not yet instructed it to search.

To handle such variability of the fingerprints, a "deviation" amount is defined that helps control the determination of whether a fingerprint matches a stored fingerprint.

Figure 3B:
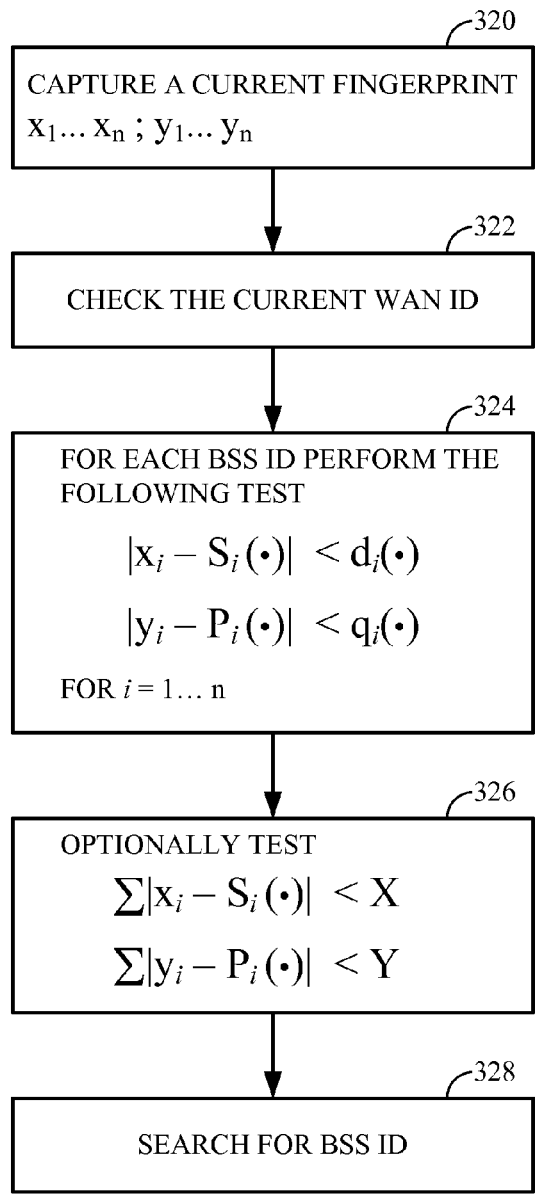
FIG. 3B depicts a flowchart of an exemplary method to compare fingerprints of different locations.

| WAN ID | WLAN BSS ID | Signal Strength | Strength Deviation | Phase | Phase Deviation |
|---|---|---|---|---|---|
| A | $A_1$ | $s_1(A_1) \ldots s_n(A_1)$ | $d_1(A_1) \ldots d_n(A_1)$ | $p_1(A_1) \ldots p_n(A_1)$ | $q_1(A_1) \ldots q_n(A_1)$ |
|   | $A_2$ | $s_1(A_2) \ldots s_n(A_2)$ | $d_1(A_2) \ldots d_n(A_2)$ | $p_1(A_2) \ldots p_n(A_2)$ | $q_1(A_2) \ldots q_n(A_2)$ |
|   | $A_3$ | $s_1(A_3) \ldots s_n(A_3)$ | $d_1(A_3) \ldots d_n(A_3)$ | $p_1(A_3) \ldots p_n(A_3)$ | $q_1(A_3) \ldots q_n(A_3)$ | areas are covered by multiple WAN service providers each with its own WAN ID (SID/NID), a table entry for an access point may occur multiple times associated with different WAN IDs with a respective signature in each. In addition to the table depicted above, a separate table (or possibly additional entries in the original table) may be used to store information about the corresponding access point (i.e., the BSS ID). For example, a wireless LAN access point typically is configured to operate on one particular channel in a particular frequency band. Rather than requiring a mobile device to search through the different possible combinations, the table can contain that operational information for the access point so that the mobile device can use it to search for the beacon signal. Other information about the access point may The above table includes a deviation value for the signal strength and a separate deviation value for the phase portion of the fingerprint. Use of these values is explained with respect to the flowchart of FIG. 3B. In step 320, the mobile device awakens or is otherwise controlled to capture a fingerprint of its current location. Continuing the example where the fingerprint has a vector for signal strengths and one for phases, a pair of vectors are collected $x_1 \ldots x_n$ and $y_1 \ldots y_n$.

In step 322, the current WAN ID is checked and the table entries for access points associated with that WAN ID are determined. Further search refinements are possible by searching the database for identifiers of the observable pilots. For the CDMA network the search criterion can be PN phase offsets of the observable pilots. Next the fingerprint for each of these access points is then compared, in step 324, to the current fingerprint to determine if there is a match. Algorithmically, the comparison and determination is performed by:

For i=1 to n:

determine if $|x_i-s_i(\cdot)|<d_i(\cdot)$ determine if $|y_i-p_i(\cdot)|<q_i(\cdot)$ Thus, the deviation values d and q can be used to select how closely the current finger print (x and y vectors) must match a stored finger print (s and p vectors). The larger the deviation values, the more the values can differ and there still be a match.

If there is a match at step 324, in step 326 an optional comparison may be made to determine whether the sum of all differences for a given access point (e.g. $|x_i-s_i(\cdot)|$ and $|y_i-p_i(\cdot)|$) also fall below a respective threshold (e.g., X and Y). This additional test can help catch certain scenarios where the individual differences may show a match but when the fingerprint is considered in total, it can be determined that there is no match.

If the tests of steps 324 and 326 are satisfied for a wireless LAN access point in the table, then the mobile device is controlled so as to search for the beacon signals of that access point. If there is no match at steps 324 or 326, the mobile device continues to look for a match on another fingerprint for another BSS ID. In an instance where possibly more than one access point fingerprint matches the current location fingerprint, then the sizes of the differences, or the sum of the differences, or some other determination may be made to select the access point with the fingerprint that most closely matches the current fingerprint. In this case of multiple matches, when the mobile device scans for WLAN access points it may locate one or more access points.

Figure 4:
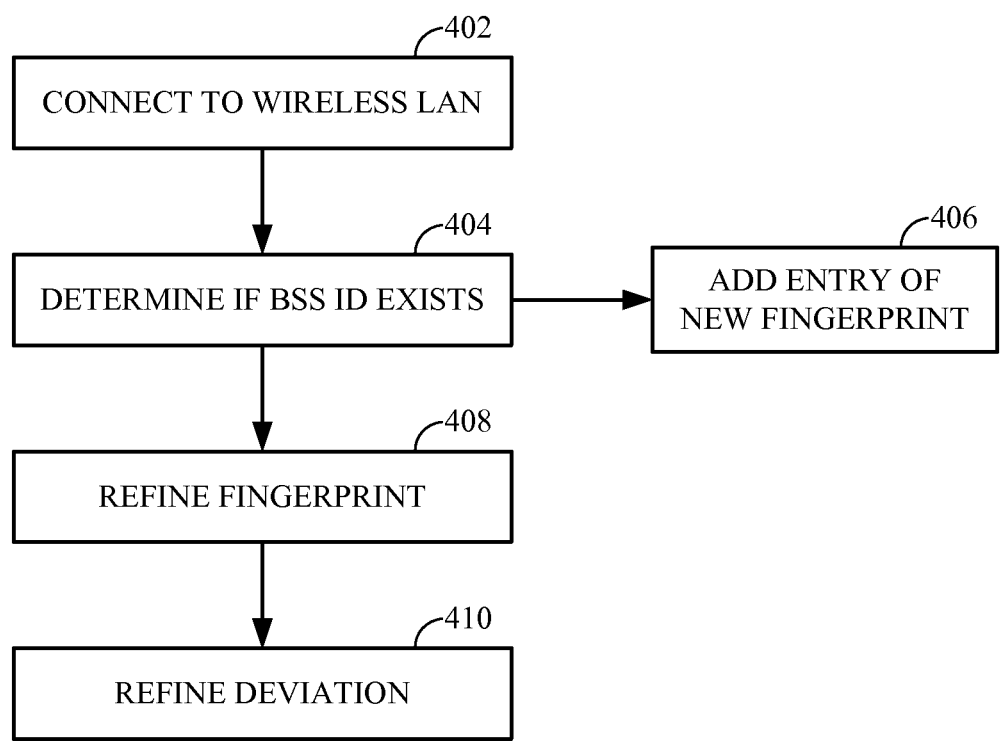
FIG. 4 depicts a flowchart of an exemplary method to refine an existing fingerprint for a known location.

FIG. 4 depicts a flowchart of an exemplary method for refining a fingerprint entry. In step 402, the mobile device, after searching for and acquiring the beacon signal, connects to the access point of the wireless LAN as is known in the art. The access point has a MAC address that is used as its BSS ID. Other identifiers may be used to differentiate between different access points; however, the BSS ID is a convenient value. Thus, in step 404, the mobile device determines if the access point to which it is connected has an entry in the fingerprint table. If not, a current fingerprint can be generated (see FIG. 3A) and then stored, in step 406. If a fingerprint entry already exists for the access point, then the current fingerprint may be used to refine the stored fingerprint, in step 408. As part of the refinement process, the deviations values, if present, may be refined as well, in step 410.

The refinement process uses the current fingerprint to modify the stored fingerprint so that the stored fingerprint, instead of representing merely the first time that access point was found, actually benefits from the values measured during the multiple times the access point was found. One example of such a refinement may be described with reference to the signal strength parameter but applies equally well to the phase parameter or any other attribute that is used to create the fingerprint. According to this method, a record of the number of times the fingerprint has been updated is maintained as well. In this example, the fingerprint for access point $A_1$ is updated for the $K^{th}$ time. The fingerprint includes the vector $s_1(A_1) \ldots s_n(A_1)$ and the current fingerprint includes the vector $x_1, \ldots, x_n$. Each value of the s vector is updated according to the formula:

new $s_i=[(K-1)(\text{old } s_i)+x_i]/K$

This type of running average refinement is merely exemplary in nature and there are many accepted mathematical techniques that could be used to refine a fingerprint value without departing from the scope of the present disclosure. A refinement to the fingerprint may also be accomplished by adding values for a new attribute (e.g., the number of measurable pilot signals) to the fingerprint instead of, or in addition to, changing existing values.

The deviation values may be refined as well. For example, the initial deviation values may be a default value. Such as, for example, 10 dB (for signal strength) or the default value for a deviation may be variable such as 5% of the fingerprint value. In this example, the measured deviation vector between the x and s vectors is a vector $m_1, \ldots, m_n$. The new deviation value $d_i$ is calculated by MAX[(previous $d_i$), $m_i$, (default $d_i$/SQRT (K))].

In the above examples, the mobile device generates the fingerprints and stores a fingerprint database. However, some or all of the fingerprints may alternatively be stored somewhere further up the wide area wireless communication network such as a database 111 accessible by the MSC 110. In this instance, the processing requirements and storage requirements may be reduced for the mobile device. In operation, the mobile device would create a current fingerprint and transmit that fingerprint to the MSC (or BSC possibly if the database was there). The MSC would then perform the fingerprint comparison and instruct the mobile device whether or not to search for an access point beacon signal. In this arrangement, the MSC could receive fingerprints from multiple mobile devices and have a much larger database of available access points than would be found in a single mobile device. Alternatively, a personalized fingerprint database may be created for each user of the wide area wireless communication network and stored at their home system.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description provides certain exemplary aspects and embodiments. Various modifications to these embodiments and aspects are within the scope of the disclosure and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communications, comprising:
    capturing a value of at least one attribute of at least one reference signal transmitted by a wide area network when a wireless communications device is in the vicinity of a wireless local area network of a plurality of wireless local area networks;
    creating a signal attribute pattern for at least one wireless local area network of the plurality of wireless local area networks based on the captured value of the at least one attribute; and
    determining whether the wireless communications device is currently in the vicinity of one of the wireless local area networks by comparing a current value of the at least one attribute from one or more reference signals received from the wide area network to the value of the at least one attribute in the signal attribute pattern stored in a memory, wherein the at least one attribute comprises a signal measurement.

2. The method of claim 1, wherein the at least one attribute comprises a plurality of signal measurements corresponding to a plurality of base stations.

3. The method of claim 1, wherein the at least one attribute comprises one or more of signal strength, pilot signal phase, spreading code and number of pilot signals.

4. The method of claim 1, wherein the value of the at least one attribute in the signal attribute pattern stored in the memory comprises a combination of multiple measurements.

5. The method of claim 1, wherein creating the signal attribute pattern is based on a received user input.

6. The method of claim 1, wherein a first signal attribute pattern corresponding to a first wireless local area network has a different number of attributes than a second signal attribute pattern corresponding to a second wireless local area network.

7. The method of claim 1, wherein a first access point of a first wireless local area network is associated with multiple wide area networks.

8. The method of claim 1, further comprising comparing a sum of differences of the current value and the value stored in memory to a threshold.

9. The method of claim 1, further comprising recording a number of times the at least one attribute has been updated.

10. The method of claim 1, further comprising refining the at least one attribute by adding a new attribute.

11. A wireless communication device, comprising:
    a processor;
    memory in electronic communication with the processor;
    instructions stored in memory, the instructions being executable to:
        capture a value of at least one attribute of at least one reference signal transmitted by a wide area network when the wireless communications device is in the vicinity of a wireless local area network of a plurality of wireless local area networks;
        create a signal attribute pattern for at least one wireless local area network of the plurality of wireless local area networks based on the captured value of the at least one attribute; and
        determine whether the wireless communications device is currently in the vicinity of one of the wireless local area networks by comparing a current value of the at least one attribute from one or more reference signals received from the wide area network to the value of the at least one attribute in the signal attribute pattern stored in the memory, wherein the at least one attribute comprises a signal measurement.

12. The wireless communication device of claim 11, wherein the at least one attribute comprises a plurality of signal measurements corresponding to a plurality of base stations.

13. The wireless communication device of claim 11, wherein the at least one attribute comprises one or more of signal strength, pilot signal phase, spreading code and number of pilot signals.

14. The wireless communication device of claim 11, wherein the value of the at least one attribute in the signal attribute pattern stored in the memory comprises a combination of multiple measurements.

15. The wireless communication device of claim 11, wherein creating the signal attribute pattern is based on a received user input.

16. The wireless communication device of claim 11, wherein a first signal attribute pattern corresponding to a first wireless local area network has a different number of attributes than a second signal attribute pattern corresponding to a second wireless local area network.

17. The wireless communication device of claim 11, wherein a first access point of a first wireless local area network is associated with multiple wide area networks.

18. The wireless communication device of claim 11, wherein the instructions are further executable to compare a sum of differences of the current value and the value stored in memory to a threshold.

19. The wireless communication device of claim 11, wherein the instructions are further executable to record a number of times the at least one attribute has been updated.

20. The wireless communication device of claim 11, wherein the instructions are further executable to refine the at least one attribute by adding a new attribute.

21. An apparatus for wireless communications, comprising:
    means for capturing a value of at least one attribute of at least one reference signal transmitted by a wide area network when the apparatus is in the vicinity of a wireless local area network of a plurality of wireless local area networks;
    means for creating a signal attribute pattern for at least one wireless local area network of the plurality of wireless local area networks based on the captured value of the at least one attribute; and
    means for determining whether the apparatus is currently in the vicinity of one of the wireless local area networks by comparing a current value of the at least one attribute from one or more reference signals received from the wide area network to the value of the at least one attribute in the signal attribute pattern stored in a memory, wherein the at least one attribute comprises a signal measurement.

22. The apparatus of claim 21, wherein the at least one attribute comprises a plurality of signal measurements corresponding to a plurality of base stations.

23. The apparatus of claim 21, wherein the at least one attribute comprises one or more of signal strength, pilot signal phase, spreading code and number of pilot signals.

24. The apparatus of claim 21, wherein creating the signal attribute pattern is based on a received user input.

25. The apparatus of claim 21, wherein a first signal attribute pattern corresponding to a first wireless local area network has a different number of attributes than a second signal attribute pattern corresponding to a second wireless local area network.

26. A non-transitory tangible computer-readable medium having instructions thereon, the instructions comprising:
   code for causing a wireless communication device to capture a value of at least one attribute of at least one reference signal transmitted by a wide area network when the wireless communication device is in the vicinity of a wireless local area network of a plurality of wireless local area networks;
   code for causing the wireless communication device to create a signal attribute pattern for at least one wireless local area network of the plurality of wireless local area networks based on the captured value of the at least one attribute; and
   code for causing the wireless communication device to determine whether the wireless communication device is currently in the vicinity of one of the wireless local area networks by comparing a current value of the at least one attribute from one or more reference signals received from the wide area network to the value of the at least one attribute in the signal attribute pattern stored in a memory, wherein the at least one attribute comprises a signal measurement.

27. The non-transitory tangible computer-readable medium of claim 26, wherein the at least one attribute comprises a plurality of signal measurements corresponding to a plurality of base stations.

28. The non-transitory tangible computer-readable medium of claim 26, wherein the at least one attribute comprises one or more of signal strength, pilot signal phase, spreading code and number of pilot signals.

29. The non-transitory tangible computer-readable medium of claim 26, wherein creating the signal attribute pattern is based on a received user input.

30. The non-transitory tangible computer-readable medium of claim 26, wherein a first signal attribute pattern corresponding to a first wireless local area network has a different number of attributes than a second signal attribute pattern corresponding to a second wireless local area network.

* * * * *